UNITED STATES PATENT OFFICE.

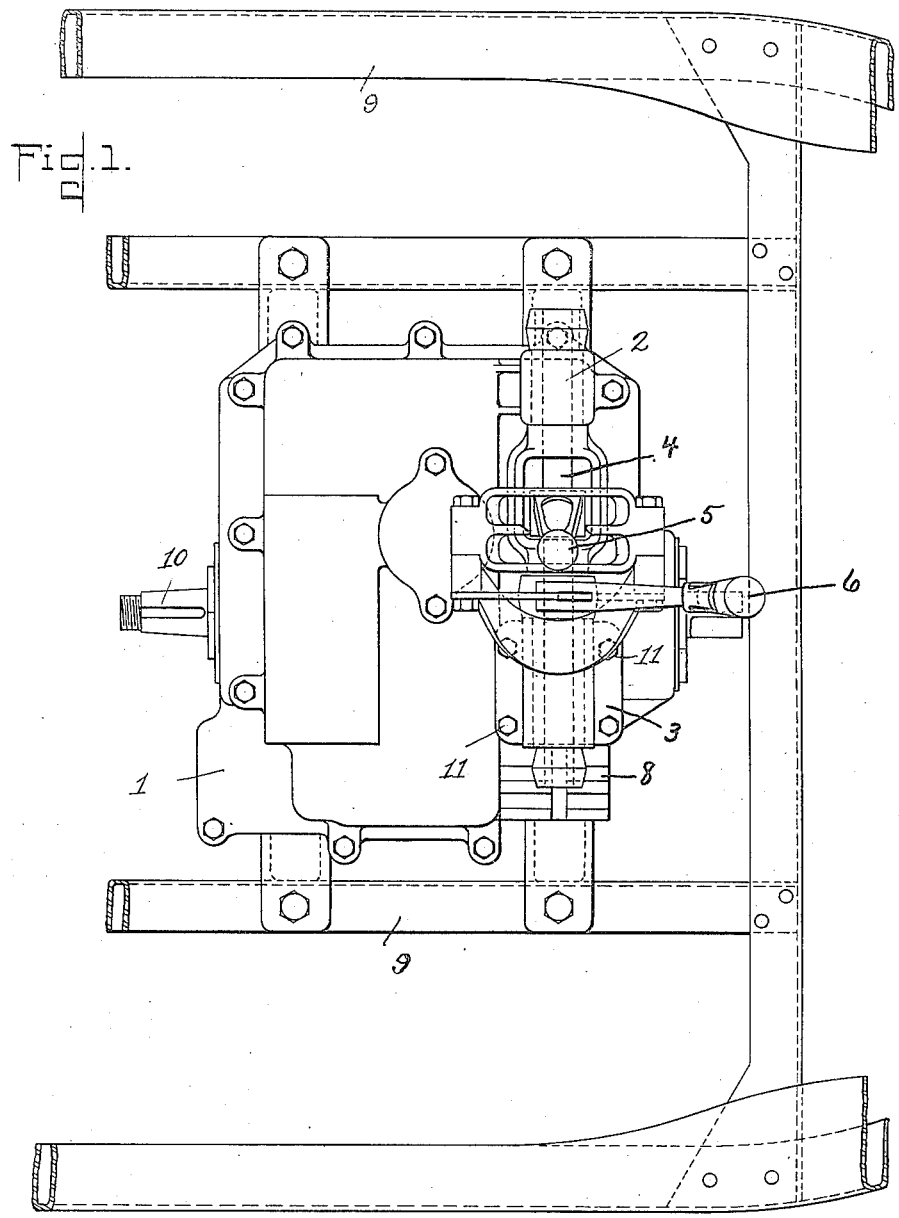

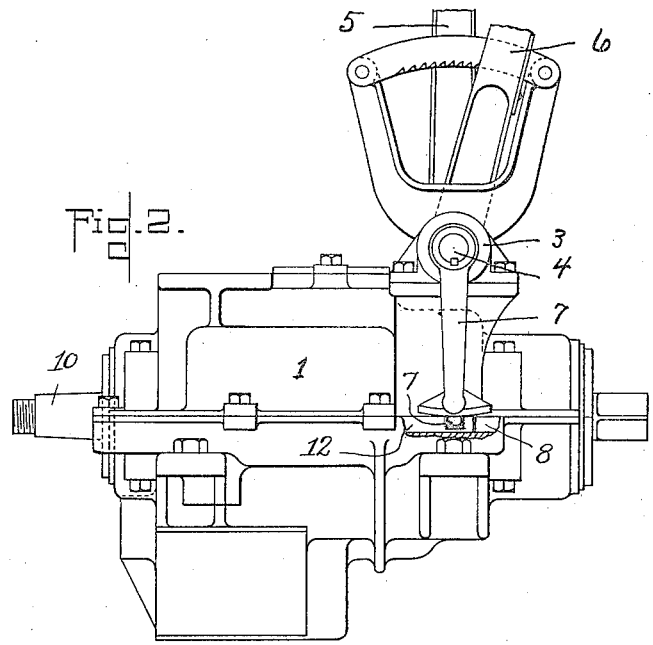
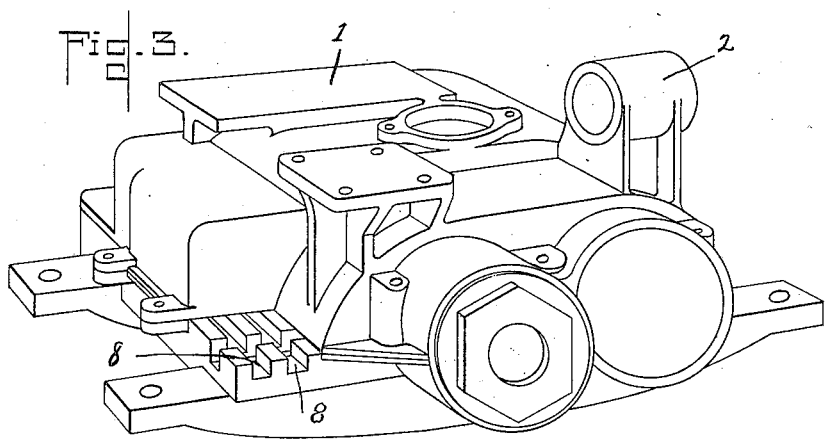

FREDRICK E. MOSKOVICS, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

GEARING.

1,215,047.  Specification of Letters Patent.  Patented Feb. 6, 1917.

Application filed July 31, 1909. Serial No. 510,504.

*To all whom it may concern:*

Be it known that I, FREDRICK E. MOSKOVICS, a citizen of the United States, residing at Bristol, in the county of Hartford and State of Connecticut, have invented certain new and useful Improvements in Gearing, of which the following is a specification.

My invention relates to gearing, and more particularly to the means for controlling the transmission gears of motor vehicles.

As is well known it is customary to mount a gear case upon the running-gear frame of a motor vehicle and to journal the transmission shaft and its change-speed gears in said case, the usual shift lever for controlling these gears being journaled upon the running-gear frame. In ordinary service a motor vehicle is subjected to many twists and strains which necessarily result in relative movement between the frame and the said gear case, particularly as it is usual to construct the running-gear frame with a certain amount of flexibility. This relative twisting between the frame and the gear case causes twisting and cramping strain between the shift lever and its connections (carried by said frame) and the change speed gears (carried by said case), the result being binding and unsatisfactory operation of those parts.

My object is to provide a structure wherein cramping and twisting between the transmission gearing and its controller is obviated, thus insuring smooth and positive operation of the controlling mechanism and consequent easy and positive action upon the transmission devices.

To this end, and also to improve generally upon devices of the character indicated, my invention consists in the various matters hereinafter described and claimed.

In the accompanying drawings,

Figure 1 is a fragmentary top plan view of a portion of a motor vehicle, particularly illustrating the frame, the gear case and the shift lever;

Fig. 2 is a side elevation, partly in section, of the gear case and certain parts carried thereby; and Fig. 3 is a perspective view of said case, certain parts carried upon the same being removed.

In the structure herein illustrated, 9 indicates the running-gear frame and 1 represents the gear case mounted thereon, said gear case having the transmission shaft 10 and its change speed gears journaled therein and also being provided with grooves 8 for the shift slides 12, all as is well understood in the art.

The shift lever or controller 5 is journaled wholly upon the said gear case 1, as by supporting the shaft 4, to which said shift lever is connected, in the bushings 2 and 3 upon the gear case. Thus the shift lever and its shaft are carried by the gear case in all movements of the said case and no twisting or cramping occurs upon the lever notwithstanding any relative movement which may occur between the transmission gear case and the running gear frame. The result is that the lever operates easily and smoothly at all times and smooth and positive operation of the change speed mechanism is assured.

Preferably, the said shift lever is, as shown, mounted in approximately the transverse center of the frame, whereby entrance to the vehicle from either side is not obstructed by the lever, and the said lever shaft 4 has two separated supports, as 2 and 3, the lever 5 being secured to the shaft between these supports, thus enabling the lever to rock the shaft without danger of twisting it. Also, one of said shaft bushings, as 3, is preferably removably fastened to the gear case, as by the bolts 11, to provide for easy and convenient assembling.

The shift lever shaft 4 provides a convenient pivot upon which to loosely mount the brake lever 6.

In the form of device herein illustrated the said shaft 4 is shown as provided with a rock arm 7 adapted to engage and operate the shift slides 12 which reciprocate in the grooves 8 and control the change speed gears in a manner well understood in the art.

Thus, by mounting the shift lever upon the transmission gear case relative movement can occur between said case and the running-gear frame without detrimental effect upon the controlling mechanism for the change speed gears and easy, smooth and positive action of such controlling mechanism is assured. Furthermore, the present mechanism provides for satisfactory mounting between the shift lever and its shaft, for ready assembling and for convenient mounting of the brake lever.

Having thus described my invention, what I claim as new and desire to secure by Letters Patent is—

1. In a motor vehicle, the combination with a frame, of a transmission mechanism supported thereby and having shifting movement with respect thereto, a controller for said transmission mechanism, and means for causing said controller to move with said transmission mechanism in said shifting movement of the latter with respect to said frame; substantially as described.

2. In a motor vehicle or the like, a flexible vehicle frame, a casing connected therewith, shifting devices carried by said casing, and a movable controller for said shifting devices mounted upon said casing; substantially as described.

3. In a motor vehicle or the like, a vehicle frame, a casing connected therewith, shifting devices carried by said casing, and a movable controller for said shifting devices mounted upon said casing and located in approximately the transverse center of said frame; substantially as described.

4. In a device of the class specified, a transmission case, a bushing integral therewith, and a removable bushing mounted thereon in alinement with each other, movable transmission mechanism, and means for operating the transmission mechanism, said means being wholly mounted on said transmission case; substantially as described.

5. In a device of the class specified, a transmission case, shiftable transmission mechanism carried thereby, a bushing integral with said case, a removable bushing mounted on said case, a rod engaging both of said bushings, and a movable controller for operating said mechanism upon said rod between said bushings; substantially as described.

In testimony whereof I affix my signature in presence of two witnesses.

FREDRICK E. MOSKOVICS.

Witnesses:
W. E. WIGHTMAN,
P. F. O'BRIEN.